US012783969B2

(12) United States Patent
Ipsen et al.

(10) Patent No.: US 12,783,969 B2
(45) Date of Patent: Nov. 3, 2026

(54) SYSTEM AND METHOD FOR USING OFFICE ATTENDANCE DATA TO GENERATE ROBUST DATA DRIVEN DECISIONS

(71) Applicant: JPMorgan Chase Bank, N.A., New York, NY (US)

(72) Inventors: Anton Ipsen, Manhattan, NY (US); Rui Manuel Ramos Teixeira Da Silva, London (GB); Michael Cashmore, Stirlingshire (GB); Nicolas Marchesotti, London (GB); Kirsty Fielding, Lancashire (GB); Daniele Magazzeni, London (GB); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 203 days.

(21) Appl. No.: 18/519,902

(22) Filed: Nov. 27, 2023

(65) Prior Publication Data

US 2025/0173633 A1 May 29, 2025

(51) Int. Cl.
*G06Q 10/04* (2023.01)
*G06Q 10/1091* (2023.01)

(52) U.S. Cl.
CPC ......... *G06Q 10/04* (2013.01); *G06Q 10/1091* (2013.01)

(58) Field of Classification Search
None
See application file for complete search history.

(56) References Cited

U.S. PATENT DOCUMENTS

| | | | | |
|---|---|---|---|---|
| 11,494,740 | B1 * | 11/2022 | Buscaglia | G06Q 10/1091 |
| 2012/0317059 | A1 * | 12/2012 | Joshi | G06Q 10/06 706/45 |
| 2019/0057340 | A1 * | 2/2019 | Wang | G06F 16/29 |
| 2019/0272509 | A1 * | 9/2019 | Livnat | H04W 4/38 |

* cited by examiner

*Primary Examiner* — Arif Ullah
(74) *Attorney, Agent, or Firm* — GREENBLUM & BERNSTEIN, P.L.C.

(57) ABSTRACT

Various methods and processes, apparatuses/systems, and media for automatically generating robust data driven decisions based on attendance data are disclosed. A processor receives, via a user interface, attendance data and population data. The population data indicates which team a given employee belongs to. The processor implements an AI system that includes an AI module and an AI planner; and causes the AI system to automatically calculate the plurality of teams' attendance on any given date which is present in the attendance data; receives input data from a user indicating whether the user wants to invoke a first process or a second process; invokes the AI module, in response to receiving the input data, that automatically generates a solution according to an AI model and configurable constraints; and causes the AI planner to automatically generate robust data driven decisions report in accordance with the solution.

17 Claims, 7 Drawing Sheets

100

600

SYSTEM AND METHOD FOR USING OFFICE ATTENDANCE DATA TO GENERATE ROBUST DATA DRIVEN DECISIONS

TECHNICAL FIELD

This disclosure generally relates to data processing, and, more particularly, to methods and apparatuses for implementing a platform, language, cloud, and database agnostic office space assigning module configured to implement an automated Artificial Intelligence (AI) system to automate method for gaining insights and generating robust data driven decisions based on attendance data.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence tools and AI systems. For instance, software has been directed to performance analysis, report generation, project tracking, and competitive analysis, to name but a few.

With the advent of hybrid work models the opportunity for optimization of the office space has only grown. Many companies have sought to use fixed in-office patterns when planning office space to increase space utilization and collaboration. For example, Team A may be scheduled to work in the Office Monday, Tuesday, Friday, whereas team B may be scheduled for Wednesday, Thursday, Friday. However, even though teams have been scheduled to come on particular days, due to unforeseen circumstances such as, but not limited to, personal reasons, health reasons or sickness the employees may elect to come to the office on a 'non-assigned day.' Thus, there can be a disconnect between the planned attendance and the actual attendance in many of the offices. Due to the uncertainty of the actual attendance, there is a need for robustness when assigning office space to different teams based on past attendance to satisfy the demand. Importantly, it may be desirable to over-allocate desks to teams as the latent cost of not having enough desks for your employees in terms of lost productivity and negative sentiment from employees may be higher than the cost of unused desks.

There can be many scenarios in which this disconnect may lead to suboptimal decisions where there is either overutilized or underutilized space. Thus, there is a need for an advanced method and tools that can address these conventional shortcomings and automate method for gaining insights and suggestions based on attendance data.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic office space assigning module configured to implement an automated AI system to automate method for gaining insights and generating robust data driven decisions based on attendance data, but the disclosure is not limited thereto.

According to exemplary embodiments, a method for automatically generating robust data driven decisions based on attendance data by utilizing one or more processors along with allocated memory is disclosed. The method may include: receiving, via a user interface, attendance data and population data, wherein the population data indicates which team among a plurality of teams a given employee belongs to; implementing an AI system, wherein the AI system includes an AI module and an AI planner; establishing a communication link between the user interface and the AI system via a communication interface; feeding the attendance data and population data into the AI system, wherein the AI system automatically calculates the plurality of teams' attendance on any given date which is present in the attendance data; receiving input data from a user indicating whether the user wants to invoke a first process or a second process; invoking the AI module, in response to receiving the input data, that automatically generates a solution according to an AI model and configurable constraints; and automatically generating, by the AI planner, robust data driven decisions report in accordance with the solution.

According to exemplary embodiments, the attendance data for an observed period may specify employees that came in on any given day, and the method may further include: providing the attendance data in either a standard tabular format in a spreadsheet or directly receiving the attendance data via an integration to a central office attendance management system.

According to exemplary embodiments, the method may further include: receiving the population data from an internal human resource system.

According to exemplary embodiments, the first process may correspond to a process that describes how to robustly fit employees into a given office space, and whether there are any attendance shifts that can be made to make allocation of the employees feasible.

According to exemplary embodiments, the method may further include: receiving input data from the user indicating that the user wants to invoke the first process; receiving target desk count data as the configurable constraints from the user for which the user wants to fit a group of employees into an office space; invoking the AI module that automatically generates the solution according to the AI model and the target desk count data; automatically generating, by the AI planner, the robust data driven decisions report that includes suggestion data comprising minimum changes to attendance patterns that allows the group of employees to fit into the office space; and interacting, by utilizing the user interface, with the AI planner, reviewing the suggestion data, and the received target desk count until a satisfiable solution has been found.

According to exemplary embodiments, the second process may correspond to a process that describes, by being distributionally robust, which accounts of uncertainty in an observed attendance data for each team, how many seats a given group of employees requires to satisfy desk demand with a given reliability.

According to exemplary embodiments, the method may further include: receiving input data from the user indicating that the user wants to invoke the second process; receiving a desired reliability data as the configurable constraints from the user for which the AI planner ensures that the desired reliability data is being accommodated in future attendance data; invoking the AI module that automatically generates the solution according to the AI model and the desired reliability data; interacting, by utilizing the user interface, with the AI planner reviewing the solution, to gauge whether changes to any team's attendance patterns are beneficial in a particular use case; updating the shifts to see an impact on desks needed; and automatically generating, by the AI planner, the robust data driven decisions report that includes number of desks needed that robustly satisfy seat demand along with any updated attendance patterns shifts that have been accepted in the step of updating.

According to exemplary embodiments, a system for automatically generating robust data driven decisions based on attendance data is disclosed, The system may include: a processor; and a memory operatively connected to the processor via a communication interface, the memory storing computer readable instructions, when executed, may cause the processor to: receive, via a user interface, attendance data and population data, wherein the population data indicates which team among a plurality of teams a given employee belongs to; implement an AI system, wherein the AI system includes an AI module and an AI planner; establish a communication link between the user interface and the AI system via a communication interface; feed the attendance data and population data into the AI system, wherein the AI system automatically calculates the plurality of teams' attendance on any given date which is present in the attendance data; receive input data from a user indicating whether the user wants to invoke a first process or a second process; invoke the AI module, in response to receiving the input data, that automatically generates a solution according to an AI model and configurable constraints; and automatically generate, by the AI planner, robust data driven decisions report in accordance with the solution.

According to exemplary embodiments, the attendance data for an observed period may specify employees that came in on any given day, the processor may be further configured to: provide the attendance data in either a standard tabular format in a spreadsheet or directly receive the attendance data via an integration to a central office attendance management system.

According to exemplary embodiments, the processor may be further configured to: receive the population data from an internal human resource system.

According to exemplary embodiments, the processor may be further configured to: receive input data from the user indicating that the user wants to invoke the first process; receive target desk count data as the configurable constraints from the user for which the user wants to fit a group of employees into an office space; invoke the AI module that automatically generates the solution according to the AI model and the target desk count data; automatically generate, by the AI planner, the robust data driven decisions report that includes suggestion data comprising minimum changes to attendance patterns that allows the group of employees to fit into the office space; and interact, by utilizing the user interface, with the AI planner, reviewing the suggestion data, and the received target desk count until a satisfiable solution has been found.

According to exemplary embodiments, the processor may be further configured to: receive input data from the user indicating that the user wants to invoke the second process; receive a desired reliability data as the configurable constraints from the user for which the AI planner ensures that the desired reliability data is being accommodated in future attendance data; invoke the AI module that automatically generates the solution according to the AI model and the desired reliability data; interact, by utilizing the user interface, with the AI planner reviewing the solution, to gauge whether changes to any team's attendance patterns are beneficial in a particular use case; update the shifts to see an impact on desks needed; and automatically generate, by the AI planner, the robust data driven decisions report that includes number of desks needed that robustly satisfy seat demand along with any updated attendance patterns shifts that have been accepted in the step of updating.

According to exemplary embodiments, a non-transitory computer readable medium configured to store instructions for automatically generating robust data driven decisions based on attendance data is disclosed. The instructions, when executed, may cause a processor to perform the following: receiving, via a user interface, attendance data and population data, wherein the population data indicates which team among a plurality of teams a given employee belongs to; implementing an AI system, wherein the AI system includes an AI module and an AI planner; establishing a communication link between the user interface and the AI system via a communication interface; feeding the attendance data and population data into the AI system, wherein the AI system automatically calculates the plurality of teams' attendance on any given date which is present in the attendance data; receiving input data from a user indicating whether the user wants to invoke a first process or a second process; invoking the AI module, in response to receiving the input data, that automatically generates a solution according to an AI model and configurable constraints; and automatically generating, by the AI planner, robust data driven decisions report in accordance with the solution.

According to exemplary embodiments, the attendance data for an observed period may specify employees that came in on any given day, the instructions, when executed, may cause the processor to further perform the following: providing the attendance data in either a standard tabular format in a spreadsheet or directly receiving the attendance data via an integration to a central office attendance management system.

According to exemplary embodiments, the instructions, when executed, may cause the processor to further perform the following: receiving the population data from an internal human resource system.

According to exemplary embodiments, the instructions, when executed, may cause the processor to further perform the following: receiving input data from the user indicating that the user wants to invoke the first process; receiving target desk count data as the configurable constraints from the user for which the user wants to fit a group of employees into an office space; invoking the AI module that automatically generates the solution according to the AI model and the target desk count data; automatically generating, by the AI planner, the robust data driven decisions report that includes suggestion data comprising minimum changes to attendance patterns that allows the group of employees to fit into the office space; and interacting, by utilizing the user interface, with the AI planner, reviewing the suggestion data, and the received target desk count until a satisfiable solution has been found.

According to exemplary embodiments, the instructions, when executed, may cause the processor to further perform the following: receiving input data from the user indicating that the user wants to invoke the second process; receiving a desired reliability data as the configurable constraints from the user for which the AI planner ensures that the desired reliability data is being accommodated in future attendance data; invoking the AI module that automatically generates the solution according to the AI model and the desired reliability data; interacting, by utilizing the user interface, with the AI planner reviewing the solution, to gauge whether changes to any team's attendance patterns are beneficial in a particular use case; updating the shifts to see an impact on desks needed; and automatically generating, by the AI planner, the robust data driven decisions report that includes number of desks needed that robustly satisfy seat demand along with any updated attendance patterns shifts that have been accepted in the step of updating.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
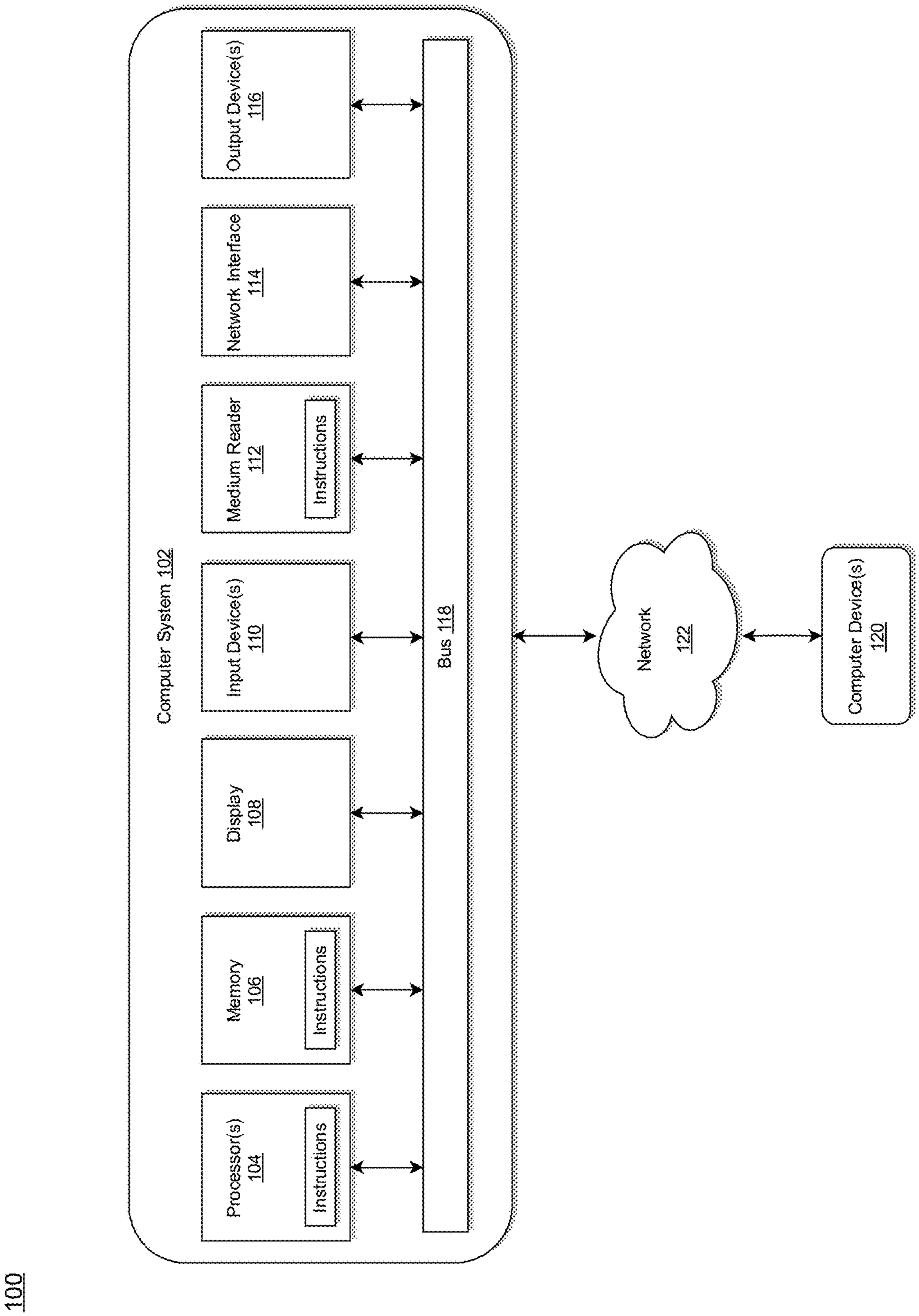
FIG. 1 illustrates a computer system for implementing a platform, language, database, and cloud agnostic office space assigning module configured to implement an AI system to automate method for gaining insights and generating robust data driven decisions based on attendance data in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic office space assigning module configured to implement an AI system to automate method for gaining insights and generating robust data driven decisions based on attendance data in accordance with an exemplary embodiment.

The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time.

The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the office space assigning module implemented by the system 100 may be platform, language, database, and cloud agnostic that may allow for consistent easy orchestration and passing of data through various components to output a desired result regardless of platform, browser, language, database, and cloud environment. Since the disclosed process, according to exemplary embodiments, is platform, language, database, browser, and cloud agnostic, the office space assigning module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
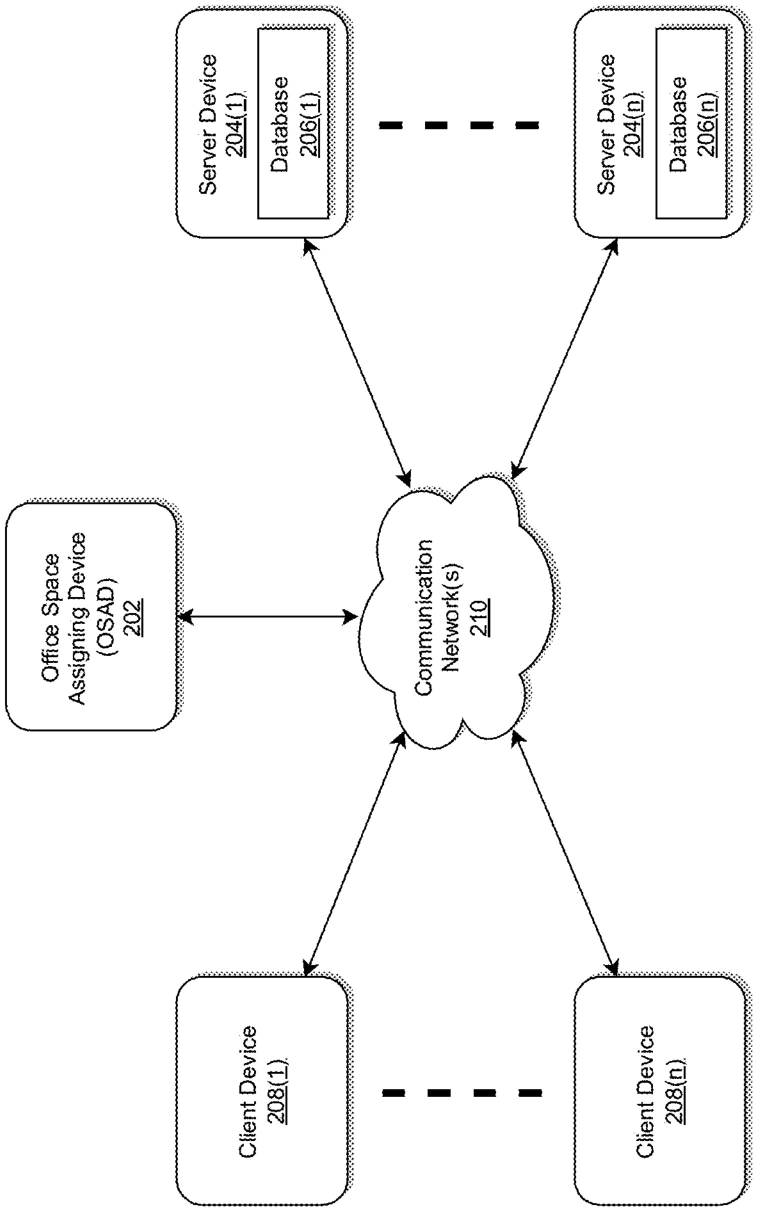
FIG. 2 illustrates an exemplary diagram of a network environment with a platform, language, database, and cloud agnostic office space assigning device in accordance with an exemplary embodiment.

Referring to FIG. 2, a schematic of an exemplary network environment 200 for implementing a language, platform, database, and cloud agnostic office space assigning device (OSAD) of the instant disclosure is illustrated.

According to exemplary embodiments, the above-described problems associated with conventional tools may be overcome by implementing an OSAD 202 as illustrated in FIG. 2 that may be configured for implementing a platform, language, database, and cloud agnostic office space assigning module configured to implement an automated AI system to automate method for gaining insights and generating robust data driven decisions based on attendance data, but the disclosure is not limited thereto.

For example, according to exemplary embodiments, the above-described problems associated with conventional tools may be overcome by implementing an OSAD 202 as illustrated in FIG. 2 that may be configured for implementing a platform, language, database, and cloud agnostic office space assigning module configured to dynamically and automatically executing processing for gaining insights and generating robust data driven decisions based on attendance data, but the disclosure is not limited thereto.

The OSAD 202 may have one or more computer system 102*s*, as described with respect to FIG. 1, which in aggregate provide the necessary functions.

The OSAD 202 may store one or more applications that can include executable instructions that, when executed by the OSAD 202, cause the OSAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the OSAD 202 itself, may be located in virtual server(s) running in a cloud-based computing environment rather than being tied to one or more specific physical network computing devices. Also, the application(s) may be running in one or more virtual machines (VMs) executing on the OSAD 202. Additionally, in one or more embodiments of this technology, virtual machine(s) running on the OSAD 202 may be managed or supervised by a hypervisor.

In the network environment 200 of FIG. 2, the OSAD 202 is coupled to a plurality of server devices 204(1)-204(*n*) that hosts a plurality of databases 206(1)-206(*n*), and also to a plurality of client devices 208(1)-208(*n*) via communication network(s) 210. A communication interface of the OSAD 202, such as the network interface 114 of the computer system 102 of FIG. 1, operatively couples and communicates between the OSAD 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the OSAD 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The OSAD 202 may be a standalone device or integrated with one or more other devices or apparatuses, such as one or more of the server devices 204(1)-204(*n*), for example. In one particular example, the OSAD 202 may be hosted by one of the server devices 204(1)-204(n), and other arrangements are also possible. Moreover, one or more of the devices of the OSAD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the OSAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the OSAD 202 that may efficiently provide a platform for implementing a platform, language, database, and cloud agnostic office space assigning module configured to implement an automated AI system to automate method for gaining insights and generating robust data driven decisions based on attendance data, but the disclosure is not limited thereto.

The client devices 208(1)-208(n) may run interface applications, such as standard web browsers or standalone client applications, which may provide an interface to communicate with the OSAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the OSAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the OSAD 202, the server devices 204(1)-204(n), or the client devices 208(1)-208(n), for example, may be configured to operate as virtual instances on the same physical machine. For example, one or more of the OSAD 202, the server devices 204(1)-204(n), or the client devices 208(1)-208(n) may operate on the same physical device rather than as separate devices communicating through communication network(s) 210. Additionally, there may be more or fewer OSADs 202, server devices 204(1)-204(n), or client devices 208(1)-208(n) than illustrated in FIG. 2. According to exemplary embodiments, the OSAD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
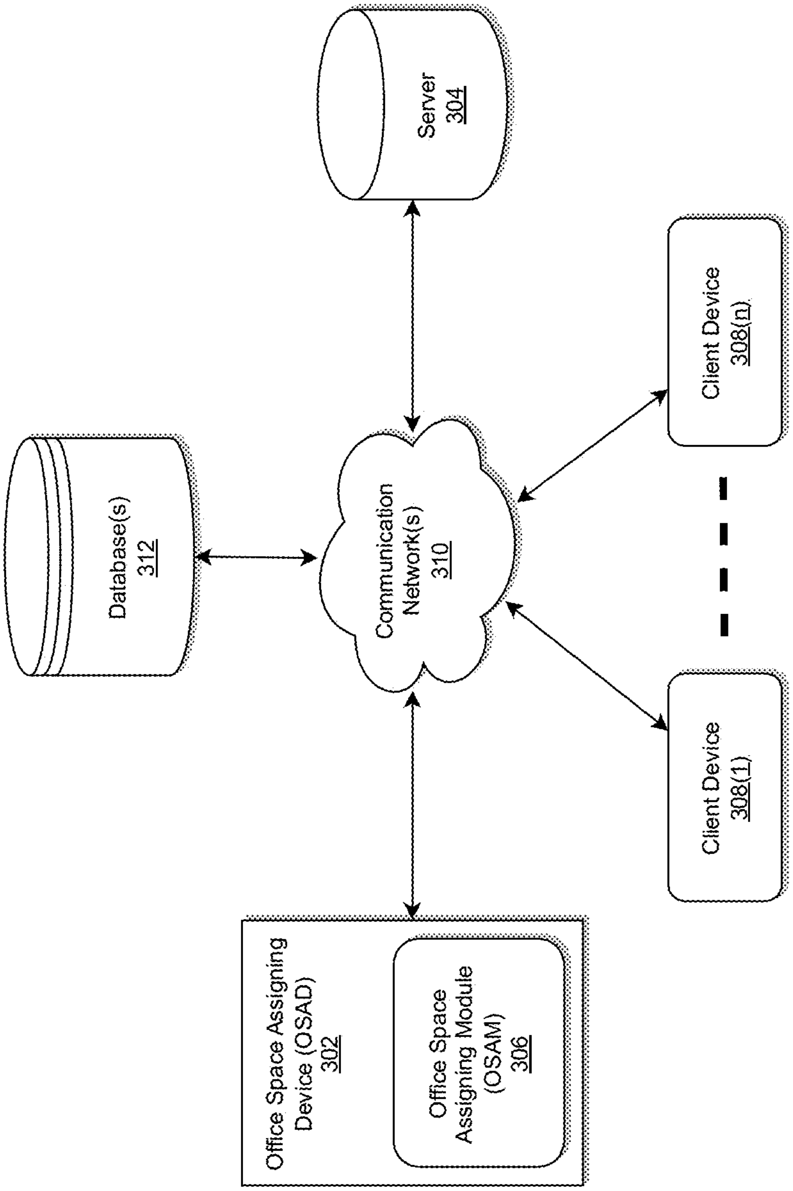
FIG. 3 illustrates a system diagram for implementing a platform, language, database, and cloud agnostic office space assigning device having a platform, language, database, and cloud agnostic office space assigning module in accordance with an exemplary embodiment.

FIG. 3 illustrates a system diagram for implementing a platform, language, and cloud agnostic OSAD having a platform, language, database, and cloud agnostic office space assigning module (OSAM) in accordance with an exemplary embodiment.

As illustrated in FIG. 3, the system 300 may include an OSAD 302 within which an OSAM 306 is embedded, a server 304, a database(s) 312, a plurality of client devices 308(1) . . . 308(n), and a communication network 310.

According to exemplary embodiments, the OSAD 302 including the OSAM 306 may be connected to the server 304, and the database(s) 312 via the communication network 310. The OSAD 302 may also be connected to the plurality of client devices 308(1) . . . 308(n) via the communication network 310, but the disclosure is not limited thereto. The database(s) 312 may include rule database.

According to exemplary embodiment, the OSAD 302 is described and shown in FIG. 3 as including the OSAM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) 312 may be a mainframe database, a log database that may produce programming for searching, monitoring, and analyzing machine-generated data via a web interface, etc., but the disclosure is not limited thereto. In addition, the database(s) 312 may store the large code bases models as directed graphs and graph metrics and graph centrality measures.

According to exemplary embodiments, the OSAM 306 may be configured to receive real-time feed of data from the plurality of client devices 308(1) . . . 308(*n*) and secondary sources via the communication network 310.

As may be described below, the OSAM 306 may be configured to: receive, via a user interface, attendance data and population data, wherein the population data indicates which team among a plurality of teams a given employee belongs to; implement an AI system, wherein the AI system includes an AI module and an AI planner; establish a communication link between the user interface and the AI system via a communication interface; feed the attendance data and population data into the AI system, wherein the AI system automatically calculates the plurality of teams' attendance on any given date which is present in the attendance data; receive input data from a user indicating whether the user wants to invoke a first process or a second process; invoke the AI module, in response to receiving the input data, that automatically generates a solution according to an AI model and configurable constraints; and automatically generate, by the AI planner, robust data driven decisions report in accordance with the solution, but the disclosure is not limited thereto.

The plurality of client devices 308(1) . . . 308(*n*) are illustrated as being in communication with the OSAD 302. In this regard, the plurality of client devices 308(1) . . . 308(*n*) may be "clients" (e.g., customers) of the OSAD 302 and are described herein as such. Nevertheless, it is to be known and understood that the plurality of client devices 308(1) . . . 308(*n*) need not necessarily be "clients" of the OSAD 302, or any entity described in association therewith herein. Any additional or alternative relationship may exist between either or both of the plurality of client devices 308(1) . . . 308(*n*) and the OSAD 302, or no relationship may exist.

The first client device 308(1) may be, for example, a smart phone. Of course, the first client device 308(1) may be any additional device described herein. The second client device 308(*n*) may be, for example, a personal computer (PC). Of course, the second client device 308(*n*) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(*n*) may communicate with the OSAD 302 via broadband or cellular communication. Of course, these embodiments are merely exemplary and are not limiting or exhaustive.

The computing device 301 may be the same or similar to any one of the client devices 208(1)-208(*n*) as described with respect to FIG. 2, including any features or combination of features described with respect thereto. The OSAD 302 may be the same or similar to the OSAD 202 as described with respect to FIG. 2, including any features or combination of features described with respect thereto.

Figure 4:
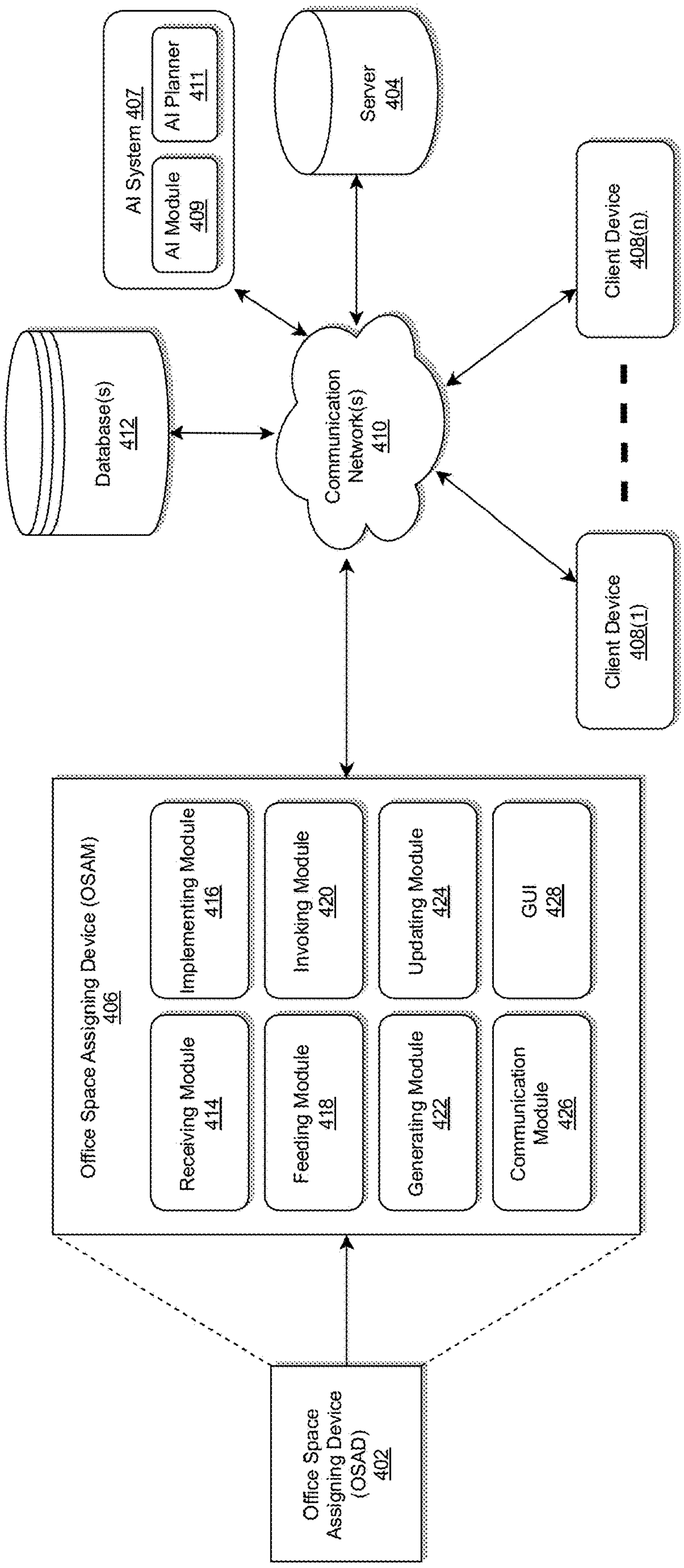
FIG. 4 illustrates a system diagram for implementing a platform, language, database, and cloud agnostic office space assigning module of FIG. 3 in accordance with an exemplary embodiment.

FIG. 4 illustrates a system diagram for implementing a platform, language, database, and cloud agnostic OSAM of FIG. 3 in accordance with an exemplary embodiment.

According to exemplary embodiments, the system 400 may include a platform, language, database, and cloud agnostic OSAD 402 within which a platform, language, database, and cloud agnostic OSAM 406 is embedded, a server 404, database(s) 412, an AI system 407 including an AI module 409 and an AI planner, and a communication network 410. According to exemplary embodiments, server 404 may comprise a plurality of servers located centrally or located in different locations, but the disclosure is not limited thereto.

According to exemplary embodiments, the OSAD 402 including the OSAM 406 may be connected to the server 404, the AI system 407, and the database(s) 412 via the communication network 410. The OSAD 402 may also be connected to the plurality of client devices 408(1)-408(*n*) via the communication network 410, but the disclosure is not limited thereto. The OSAM 406, the server 404, the plurality of client devices 408(1)-408(*n*), the database(s) 412, the communication network 410 as illustrated in FIG. 4 may be the same or similar to the OSAM 306, the server 304, the plurality of client devices 308(1)-308(*n*), the database(s) 312, the communication network 310, respectively, as illustrated in FIG. 3.

According to exemplary embodiments, the OSAM 406 implements the two processes: i) robust attendance shift for teams and ii) distributional robust desk requirements, but the disclosure is not limited thereto.

According to exemplary embodiments, the first process i) may correspond to a process that describes how to robustly fit employees into a given office space, and whether there are any attendance shifts that can be made to make allocation of the employees feasible.

For example, the building and business managers might want to understand the lowest shift changes needed to comfortably fit a population into a given space. According to exemplary embodiments, the first process i) implemented by the OSAM 406 takes as input teams' attendance on any given days and a target number of seats and proposes the minimum change in each team's attendance pattern to satisfy the target seat number. For example, the OSAM 406 may be configured to return, as a secondary objective, the minimum number of teams and minimum number of people moved. In this exemplary embodiment, the first process i) implemented by the OSAM 406, achieves a satisfiable solution that balances desk required and number of teams/employees moved. Thus, for the first process i) a solution, according to an exemplary embodiment, is the number of teams and people moved in order to satisfy the space constraint. In this way, business managers can then create incentives for the teams to shift their attendance according to the suggestions.

According to exemplary embodiments, the second process ii) may correspond to a process that describes, by being distributionally robust, which accounts of uncertainty in an observed attendance data for each team, how many seats a given group of employees requires to satisfy desk demand with a given reliability.

For example, in another scenario, the building and business managers want to determine the number of seats needed to satisfy the demand of a given population of teams given their past attendance data. However, the demand only needs to be satisfied with a given probability, as satisfying all the past demand might be costly or not relevant due to business reasons. According to exemplary embodiments, the output of the second process ii) implemented by the OSAM 406 would be the seat count required to satisfy the demand of a population for a given user-specified probability, along with suggestions for attendance patterns shifts for different teams.

According to exemplary embodiments, the OSAM 406 as implemented herein may be configured to automate method (i.e., processes i) and ii) as disclosed earlier) for gaining insights and suggestions based on attendance data may be required for the following reasons, but the disclosure is not limited thereto.

A. Assisting with data-driven decision-making while accounting for uncertainty: As specified earlier, this pipeline may be needed to bridge the gap between actual attendance and planned attendance to understand if the planned attendance is feasible. Additionally, this method aims to account for the observed variance in the attendance of the different teams.

B. Optimization of Real-Estate Usage: By understanding the latent attendance patterns allows model office administrators to better manage the real-estate office assets. This can lead to reducing the number of seats needed, or allowing the model user to faster provide more office seats to the teams that need them.

At the same time, re-optimization of office space needs of a population may change due to: team size changes, temporary changes in space available, and scenario assessment.

For example, the size of the teams may change over time (team size changes). Whereas some teams may grow, thus requiring more space, others may shrink, requiring fewer seats. Moreover, the number of interns, part-time employees and contractors may also fluctuate with the business needs. As a result, a given seat allocation can quickly become suboptimal as time progresses.

Also, the seating capacity may change throughout time (temporary changes in space available), for example due to maintenance/constructions works, among others. This may require teams to change their existing office attendance patterns to accommodate those changes.

Moreover, the business may wish to explore how repurposing the space (scenario assessment) to cater for other type of work (e.g., creating a large collaborative space within a floor to encourage large group discussions) could impact attendance patterns and the need to change existing patterns to accommodate those changes.

Details of the OSAM 406 is provided below with corresponding modules.

According to exemplary embodiments, as illustrated in FIG. 4, the OSAM 406 may include a receiving module 414, an implementing module 416, a feeding module 418, an invoking module 420, a generating module 422, an updating module 424, a communication module 426, and a GUI 428. According to exemplary embodiments, interactions and data exchange among these modules included in the OSAM 406 provide the advantageous effects of the disclosed invention. Functionalities of each module of FIG. 4 may be described in detail below with reference to FIGS. 4-7.

According to exemplary embodiments, each of the receiving module 414, implementing module 416, feeding module 418, invoking module 420, generating module 422, updating module 424, and the communication module 426 of the OSAM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, implementing module 416, feeding module 418, invoking module 420, generating module 422, updating module 424, and the communication module 426 of the OSAM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the receiving module 414, implementing module 416, feeding module 418, invoking module 420, generating module 422, updating module 424, and the communication module 426 of the OSAM 406 of FIG. 4 may be implemented by dedicated hardware, or as a combination of dedicated hardware to perform some functions and a processor (e.g., one or more programmed microprocessors and associated circuitry) to perform other functions, but the disclosure is not limited thereto. For example, the OSAM 406 of FIG. 4 may also be implemented by Cloud based deployment.

According to exemplary embodiments, each of the receiving module 414, implementing module 416, feeding module 418, invoking module 420, generating module 422, updating module 424, and the communication module 426 of the OSAM 406 of FIG. 4 may be called via corresponding API, but the disclosure is not limited thereto.

According to exemplary embodiments, the process implemented by the OSAM 406 may be executed via the communication module 426 and the communication network 410, which may comprise plural networks as described above. For example, in an exemplary embodiment, the various components of the OSAM 406 may communicate with the server 404, and the database(s) 412 via the communication module 426 and the communication network 410 and the results may be displayed onto the GUI 428. Of course, these embodiments are merely exemplary and are not limiting or exhaustive. The database(s) 412 may include the databases included within the private cloud and/or public cloud and the server 404 may include one or more servers within the private cloud and the public cloud.

For example, according to exemplary embodiments, the receiving module 414 may be configured to receive, via the GUI 428, attendance data and population data. The population data may indicate which team among a plurality of teams a given employee belongs to. The implementing module 416 may be configured to implement an AI system 407. The AI system 407 may include an AI module 409 and an AI planner 411.

According to exemplary embodiments, the communication module 426 may be configured to establish a communication link between the GUI 428 and the AI system 407 via a communication interface embedded within the communication module 426. The feeding module 418 may be configured to feed the attendance data and population data (obtained from the database(s) 412) into the AI system 407. The AI system 407 may automatically calculate the plurality of teams' attendance on any given date which is present in the attendance data.

According to exemplary embodiments, the receiving module 414 may be configured to receive input data from a user indicating whether the user wants to invoke a first process or a second process. The invoking module 420 may be configured to invoke the AI module 409, in response to receiving the input data, that automatically generates a solution according to an AI model and configurable constraints; and the generating module 422 may be configured to automatically generate, by utilizing the AI planner 411, robust data driven decisions report in accordance with the solution.

Figure 6:
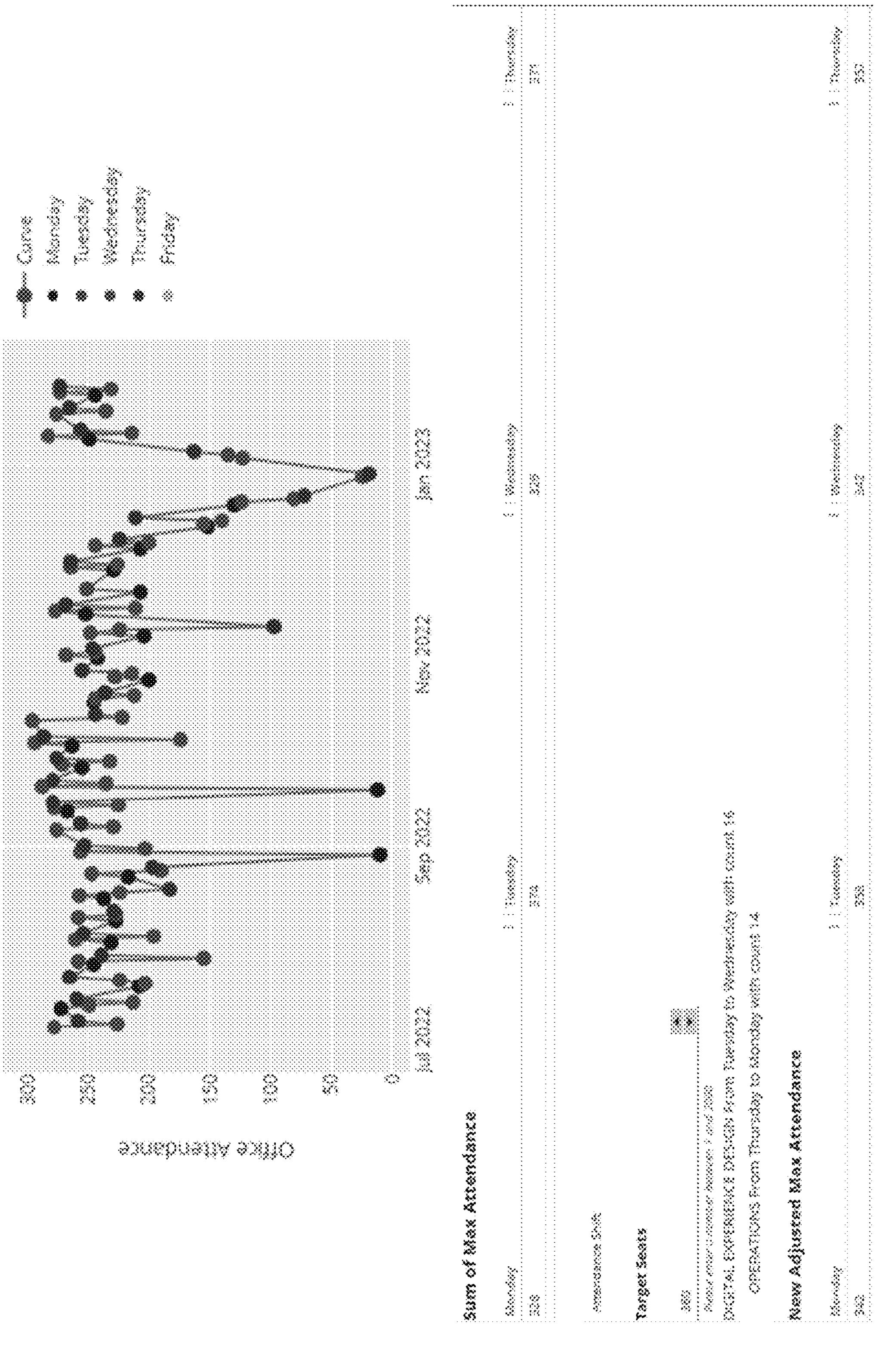
FIG. 6 illustrates an exemplary report based on robust maximum attendance shift process implemented by the platform, language, database, and cloud agnostic office space assigning module of FIG. 4 in accordance with an exemplary embodiment.
Figure 7:
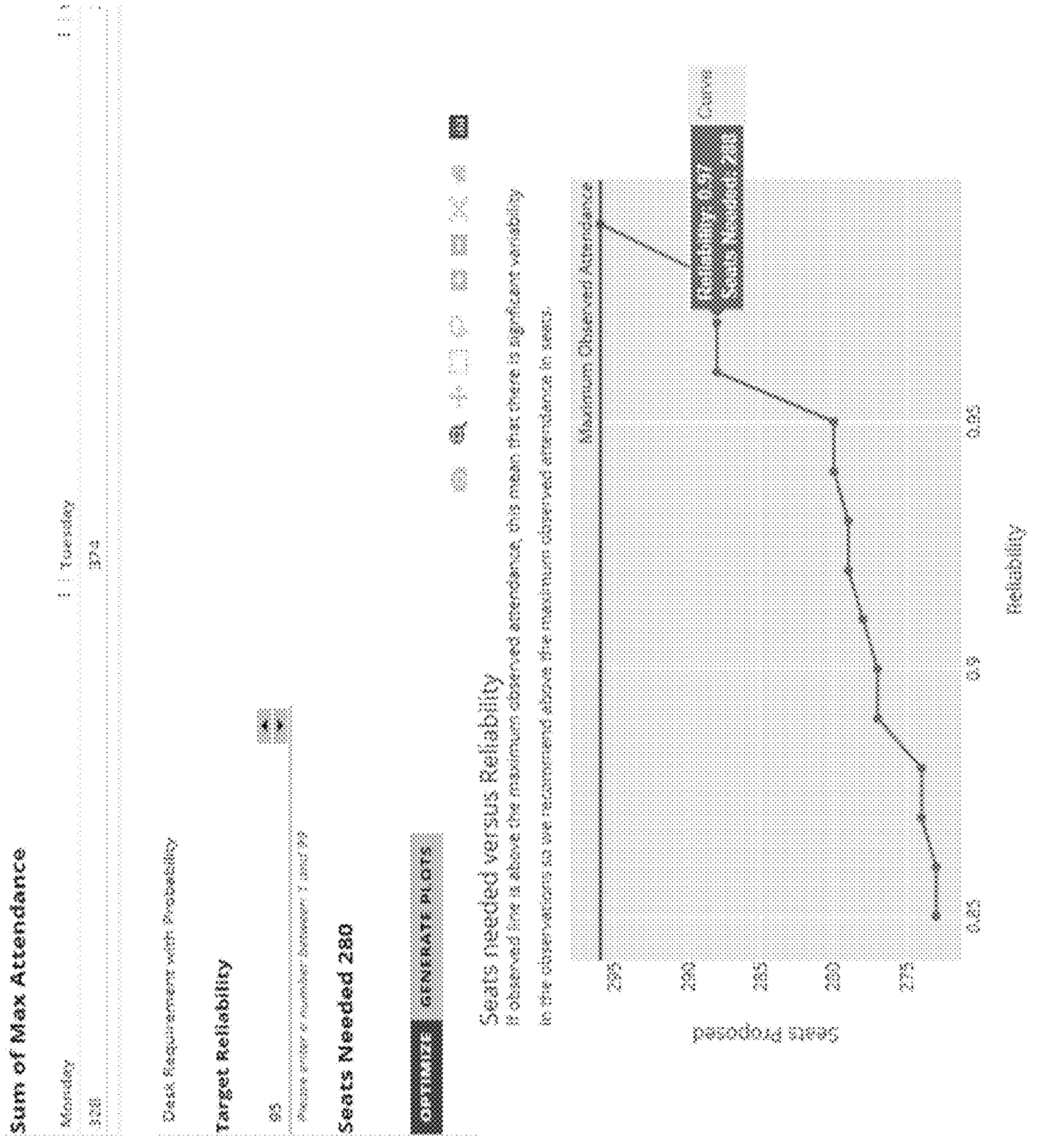
FIG. 7 illustrates an exemplary report based on distributionally robust chance constrained desk requirement process as implemented by the platform, language, database, and cloud agnostic office space assigning module of FIG. 4 in accordance with an exemplary embodiment.

For example, FIG. 6 illustrates an exemplary report 600 based on the first process, i.e., robust maximum attendance shift process, implemented by the OSAM 406 in accordance with an exemplary embodiment. And FIG. 7 illustrates an exemplary report 700 based on the second process, i.e., distributionally robust chance constrained desk requirement process as implemented by the OSAM 406 in accordance with an exemplary embodiment.

According to exemplary embodiments, the attendance data for an observed period may specify employees that came in on any given day. The OSAM 406 may be further configured to provide the attendance data in either a standard tabular format in a spreadsheet or directly receive the attendance data via an integration to a central office attendance management system.

According to exemplary embodiments, the receiving module 414 may be further configured to receive the population data from an internal human resource system.

According to exemplary embodiments, the receiving module 414 may be further configured to receive input data from the user indicating that the user wants to invoke the first process i), and thereby may receive target desk count data as the configurable constraints from the user for which the user wants to fit a group of employees into an office space. In response, the invoking module 420 may be configured to invoke the AI module 409 that automatically generates the solution according to the AI model and the target desk count data. The generating module 422 may be configured to automatically generate, by utilizing the AI planner 411, the robust data driven decisions report (i.e., report 600 as illustrated in FIG. 6) that includes suggestion data comprising minimum changes to attendance patterns that allows the group of employees to fit into the office space. The user may interact, by utilizing the GUI 428, with the AI planner 411, reviewing the suggestion data, and the received target desk count until a satisfiable solution has been found. According to exemplary embodiments, for the first process i) a solution may include reporting back the number of teams and employees affected by the shift. This way, based on this report, the business managers may argue for a larger space for the population, if the only solution suggests very complicated moves.

According to exemplary embodiments, the receiving module 414 may be further configured to receive input data from the user indicating that the user wants to invoke the second process ii), and thereby may receive a desired reliability data as the configurable constraints from the user for which the AI planner 411 ensures that the desired reliability data is being accommodated in future attendance data. In response, the invoking module 420 may invoke the AI module 409 that automatically generates the solution according to the AI model and the desired reliability data. The user may interact, by utilizing the GUI 428, with the AI planner 411 reviewing the solution, to gauge whether changes to any team's attendance patterns are beneficial in a particular use case. The updating module 424 may be configured to update the shifts to see an impact on desks needed; and the generating module 422 may be configured to automatically generate, by utilizing the AI planner 411, the robust data driven decisions report (i.e., report 700 as illustrated in FIG. 7) that includes number of desks needed that robustly satisfy seat demand along with any updated attendance patterns shifts that have been accepted in the step of updating.

Each method, i.e., process i) and process ii), can have specific user defined constraints that allow the user tailor the algorithm to their specific use case.

In the section below, how these pieces of information are generated is described below in details, but the disclosure is not limited thereto.

Attendance Data and Population Data

According to exemplary embodiments, the attendance data may be provided in either a standard tabular format in a spreadsheet or provided directly via an integration to a central office attendance management system. The attendance data format may be provided in several formats such as, but not limited to, a team's attendance on a supplied date, or as described above in format of which employees came to the office on a given date.

According to exemplary embodiments, the population data may be provided in a standard tabular format in a spreadsheet. It may include, for example, general team identification information (id, name), and business-related information (management hierarchy). This information may be extracted from internal HR (Human Resources) systems.

Robust Attendance Shift for Teams (First Process—Process i)

According to exemplary embodiments, this optimization problem may be framed as a problem with integer variables—a Mixed Integer Linear Program. Solving this optimization problem corresponds to finding a solution that minimizes a given objective function while satisfying all constraints involved. The OSAM 406 may be configured to formulate the objective functions that evaluates a given solution as with the below metrics:

A. Number of team's affected: The main metric which considers how many teams had their attendance shifted to satisfy the constraints.

B. Number of employees affected: The secondary metric, which considers how many employees in total, had their attendance shifted.

Mathematically, the OSAM 406 may formulate the deterministic attendance shift constraint as:

$$\sum_{t\in T} A_{td} + a_{td} \leq C \,\forall\, d \in D.$$

Where $A_{td}$ maximum observed attendance of team t on day d, $a_{td}$ adjusted attendance of team t which belongs to a set of teams T on day d, C capacity of the user specified space, and D is the set of days considered. The OSAM 406 are accounting for the uncertainty in the future attendance of every team by using robust optimization techniques that allows the model-creators to specify an uncertainty set for the future maximum attendance of each team. Based on domain knowledge, the OSAM 406 has chosen a budget uncertainty set for the above constraint, where z is the bounded uncertainty with the maximum value of 1, and an absolute budget of r uncertainty $$Z_d = \{z: \|z\|_\infty \leq 1, \|z\|_1 \leq r\}.$$

The uncertainty set specified in process i) above can in theory be any uncertainty set. The budget uncertainty set described above is only an exemplary embodiment.

The OSAM 406 can then reformulate the deterministic constraint as shown above, where the goal of the optimization is to ensure that we can satisfy the desk capacity of the space even in the worst-case scenario.

$$\sum_{t\in T}(A_{td}(+z_tS_t+a_{td})\leq C\,\forall\, d\in D,\,\forall\, z\in Z_d.$$

$\delta_t$ refers to the prior belief of maximum variation in maximum office attendance for each team.

Distributionally Robust Desk Requirements (Second Process—Process ii)

In open space offices with "hot-desking" (teams and employees are NOT assigned to a specific desk/area), a question that may arise is that of "With probability p, what is the minimum number of seats needed to host a population with historical attendance $\mathcal{A}$?." One exemplary answer to this question would be selecting the maximum historical attendance. However, this may be very costly. For example, the maximum attendance observed may have been the result of a onetime event where more people than usual visited the office—planning an office allocation based on these one-off events could lead to unused office space on "normal days."

According to exemplary embodiments, the OSAM 406 can define the problem as a chance constrained problem by using Mixed-Integer and Constraint Programming as:

$$\min_D D$$
$$\text{s.t.}$$
$$\mathbb{P}(D\geq\hat{A})\geq 1-\varepsilon$$

Where D is the desk capacity recommended by the AI, Â is the aggregate demand observed on any given day, and 1−ε is the desired reliability that the user specifies. Reliability refers to the percentage of days that the OSAM 406 satisfies the demand for office desks on any given day. $\mathbb{P}$ refers to the actual probability of satisfying the constraints, and therefore the equation reads as: a user wants the probability that the user satisfies the demand with the desk capacity D on any given day to be equal or greater to the model user's specified reliability.

According to exemplary embodiments, the above formulation may be solved in a myriad of different ways. Many approaches only consider the observed data when satisfying the reliability constraint. However, in practice this may lead to poor out of sample behavior. In practice, this may mean the specified reliability does not hold in future data being planned for.

According to exemplary embodiments, the processes implemented by the OSAM 406 may be configured to utilize distributional robust chance constraints mixed integer programming to solve the following equation:

$$\min_D D$$
$$\text{s.t.}$$
$$\inf_{\mathbb{P}\in P_n}\mathbb{P}(D\geq\hat{A})\geq 1-\varepsilon$$

where $\mathcal{P}$N refers to an ambiguity set which contains all the probability distributions $\mathbb{P}$ that OSAM 406 believe the true attendance probability distributions can belong to. Therefore, by minimizing the worst-case number of seats needed over all the probability distributions in $\mathcal{P}_N$, OSAM 406 are guaranteed by satisfying the worst-case seat demand in any scenario to be more robust. This allows us to have better guarantees for the out-of-sample reliability so that the specified reliability also holds for future observations.

Constraints and Preferences

According to exemplary embodiments, as mentioned earlier, the constraints specified in two different model may include, but not limited to: i) Robust Attendance Shift for Teams, and ii) and Distributionally Robust Desk Requirements.

i) Robust Attendance Shift for Teams

Team's which attendance cannot be shifted: Certain team can be exempted from having their attendance shifted.

Days to ignore: It can be desired to not reason over certain days such as Fridays and Weekends, as those days usually are sparsely attended.

Attendance to be shifted to another area: It could be possible that users could shift teams to a different area or floor outside of the one the users are planning for, as the users have prior knowledge that these areas are empty on certain days. This could be the case if the users know that a certain area is currently underutilized.

According to exemplary embodiments, under process i), the preferences of the model may include:

A. Limited number of changes suggested: In both models a user can limit the number of proposed shifts to a certain number to better understand the trade-off between moving teams and savings seats.

B. Team's that must be moved together: Certain teams might have affinities which could lead them to be moved together.

ii) Distributionally Robust Desk Requirements

Days to ignore: It can be desired to not reason over certain days such as Fridays and Weekends, as those days usually are sparsely attended.

Buffer: Percentage of extra space requested by the user.

Reasoning over different types of seats: In certain office settings there is different kinds of seats to for instance accommodate disabilities or different workflows (trading, design, engineering, offices).

According to exemplary embodiments, the processes implemented by the OSAM 406 may result in significant real-estate savings when planning for the number of desks for a given workforce for a given space. The advantage of the processes as disclosed herein it that these processes may easily be integrated into existing office management software, and that the AI accounts for uncertainty in its planning. This in turn may drive down costs from lost productivity of not finding a desk and ensure that employee satisfaction with a given workspace remains constant. The framework utilized by the OSAM 406 as disclosed herein may also be done on a continued practice to always ensure that teams are allocated space dynamically based on their current needs and usage.

According to exemplary embodiments, the OSAM 406 may be integrated with other office management software for improved functionalities. For example, the processes disclosed herein may integrate with other software such as stacking, pattern optimizer, restacking software, visitor management system or desk booking system to optimize the overall office environment, but the disclosure is not limited thereto.

According to exemplary embodiments, the OSAM 406 may be integrated with existing known patterns. For example, traditionally, many employees are following an assigned pattern when coming into the office. The process implemented by the OSAM 406 may be integrated with the assigned patterns to suggest changes to patterns, but the disclosure is not limited thereto.

According to exemplary embodiments, the OSAM 406 may be utilized for providing real-time seating adjustments. For example, the processes implemented by the OSAM 406 may be extended to help plan for real-time seating adjustments, as those methods also require robust planning by using attendance data to seat teams dynamically when entering the office asset, but the disclosure is not limited thereto.

Figure 5:
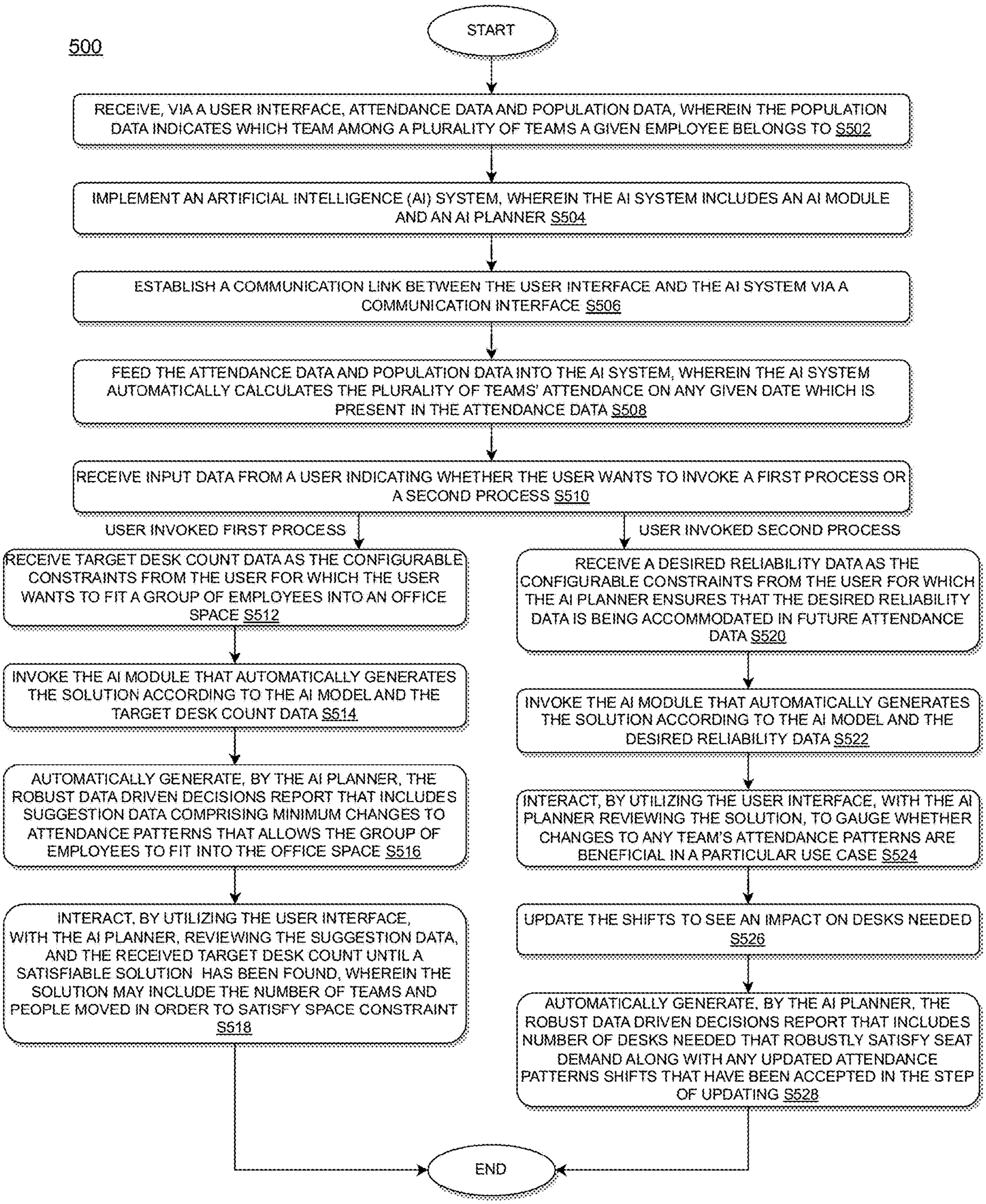
FIG. 5 illustrates an exemplary flow chart of a process implemented by the platform, language, database, and cloud agnostic office space assigning module of FIG. 4 for implementing an AI system to automate method for gaining insights and generating robust data driven decisions based on attendance data in accordance with an exemplary embodiment.

FIG. 5 illustrates an exemplary flow chart of a process 500 implemented by the platform, language, database, and cloud agnostic OSAM 405 of FIG. 4 for implementing an AI system to automate method for gaining insights and generating robust data driven decisions based on attendance data in accordance with an exemplary embodiment. It may be appreciated that the illustrated process 500 and associated steps may be performed in a different order, with illustrated steps omitted, with additional steps added, or with a combination of reordered, combined, omitted, or additional steps.

As illustrated in FIG. 5, at step S502, the process 500 may include receiving, via a user interface, attendance data and population data, wherein the population data indicates which team among a plurality of teams a given employee belongs to.

At step S504, the process 500 may include implementing an Artificial Intelligence (AI) system, wherein the AI system includes an AI module and an AI planner.

At step S506, the process 500 may include establishing a communication link between the user interface and the AI system via a communication interface.

At step S508, the process 500 may include feeding the attendance data and population data into the AI system, wherein the AI system automatically calculates the plurality of teams' attendance on any given date which is present in the attendance data.

At step S510, the process 500 may include receiving input data from a user indicating whether the user wants to invoke a first process or a second process.

According to exemplary embodiments, in the process 500, the first process may correspond to a process that describes how to robustly fit employees into a given office space, and whether there are any attendance shifts that can be made to make allocation of the employees feasible.

For example, according to exemplary embodiments, when at step S510, the process 500 receives input data from the user indicating that the user wants to invoke the first process, the process 500 then executes steps S512, S514, S516, and S518.

At step S512, the process 500 may include receiving target desk count data as the configurable constraints from the user for which the user wants to fit a group of employees into an office space.

At step S514, the process 500 may include invoking the AI module that automatically generates the solution according to the AI model and the target desk count data.

At step S516, the process 500 may include automatically generating, by the AI planner, the robust data driven decisions report that includes suggestion data comprising minimum changes to attendance patterns that allows the group of employees to fit into the office space.

At step S518, the process 500 may include interacting, by utilizing the user interface, with the AI planner, reviewing the suggestion data, and the received target desk count until a satisfiable solution has been found.

According to exemplary embodiments, in the process 500, the second process may correspond to a process that describes, by being distributionally robust, which accounts of uncertainty in an observed attendance data for each team, how many seats a given group of employees requires to satisfy desk demand with a given reliability.

For example, according to exemplary embodiments, when at step S510, the process 500 receives input data from the user indicating that the user wants to invoke the second process, the process 500 then executes steps S520, S522, S524, S526, and S528.

At step S520, the process 500 may include receiving a desired reliability data as the configurable constraints from the user for which the AI planner ensures that the desired reliability data is being accommodated in future attendance data.

At step S522, the process 500 may include invoking the AI module that automatically generates the solution according to the AI model and the desired reliability data.

At step S524, the process 500 may include interacting, by utilizing the user interface, with the AI planner reviewing the solution, to gauge whether changes to any team's attendance patterns are beneficial in a particular use case.

At step S526, the process 500 may include updating the shifts to see an impact on desks needed.

At step S528, the process 500 may include automatically generating, by the AI planner, the robust data driven decisions report that includes number of desks needed that robustly satisfy seat demand along with any updated attendance patterns shifts that have been accepted in the step of updating.

According to exemplary embodiments, the attendance data for an observed period may specify employees that came in on any given day, and the process 500 may further include: providing the attendance data in either a standard tabular format in a spreadsheet or directly receiving the attendance data via an integration to a central office attendance management system.

According to exemplary embodiments, the process 500 may further include: receiving the population data from an internal human resource system.

According to exemplary embodiments, the OSAD 402 may include a memory (e.g., a memory 106 as illustrated in FIG. 1) which may be a non-transitory computer readable medium that may be configured to store instructions for implementing a platform, language, database, and cloud agnostic OSAM 406 for automatically generating robust data driven decisions based on attendance data as disclosed herein. The OSAD 402 may also include a medium reader (e.g., a medium reader 112 as illustrated in FIG. 1) which may be configured to read any one or more sets of instructions, e.g., software, from any of the memories described herein. The instructions, when executed by a processor embedded within the OSAM 406 or within the OSAD 402, may be used to perform one or more of the methods and processes as described herein. In a particular embodiment, the instructions may reside completely, or at least partially, within the memory 106, the medium reader 112, and/or the processor 104(see FIG. 1) during execution by the OSAD 402.

According to exemplary embodiments, the instructions, when executed, may cause a processor embedded within the OSAM 406 or the OSAD 402 to perform the following: receiving, via a user interface, attendance data and population data, wherein the population data indicates which team among a plurality of teams a given employee belongs to; implementing an AI system, wherein the AI system includes an AI module and an AI planner; establishing a communication link between the user interface and the AI system via a communication interface; feeding the attendance data and population data into the AI system, wherein the AI system automatically calculates the plurality of teams' attendance on any given date which is present in the attendance data; receiving input data from a user indicating whether the user wants to invoke a first process or a second process; invoking the AI module, in response to receiving the input data, that automatically generates a solution according to an AI model and configurable constraints; and automatically generating, by the AI planner, robust data driven decisions report in accordance with the solution. According to exemplary embodiments, the processor may be the same or similar to the processor 104 as illustrated in FIG. 1 or the processor embedded within the OSAD 202, OSAD 302, OSAD 402, and OSAM 406 which is the same or similar to the processor 104.

According to exemplary embodiments, the attendance data for an observed period may specify employees that came in on any given day, the instructions, when executed, may cause the processor 104 to further perform the following: providing the attendance data in either a standard tabular format in a spreadsheet or directly receiving the attendance data via an integration to a central office attendance management system.

According to exemplary embodiments, the instructions, when executed, may cause the processor 104 to further perform the following: receiving the population data from an internal human resource system.

According to exemplary embodiments, the instructions, when executed, may cause the processor 104 to further perform the following: receiving input data from the user indicating that the user wants to invoke the first process; receiving target desk count data as the configurable constraints from the user for which the user wants to fit a group of employees into an office space; invoking the AI module that automatically generates the solution according to the AI model and the target desk count data; automatically generating, by the AI planner, the robust data driven decisions report that includes suggestion data comprising minimum changes to attendance patterns that allows the group of employees to fit into the office space; and interacting, by utilizing the user interface, with the AI planner, reviewing the suggestion data, and the received target desk count until a satisfiable solution has been found.

According to exemplary embodiments, the instructions, when executed, may cause the processor 104 to further perform the following: receiving input data from the user indicating that the user wants to invoke the second process; receiving a desired reliability data as the configurable constraints from the user for which the AI planner ensures that the desired reliability data is being accommodated in future attendance data; invoking the AI module that automatically generates the solution according to the AI model and the desired reliability data; interacting, by utilizing the user interface, with the AI planner reviewing the solution, to gauge whether changes to any team's attendance patterns are beneficial in a particular use case; updating the shifts to see an impact on desks needed; and automatically generating, by the AI planner, the robust data driven decisions report that includes number of desks needed that robustly satisfy seat demand along with any updated attendance patterns shifts that have been accepted in the step of updating.

According to exemplary embodiments as disclosed above in FIGS. 1-7, technical improvements effected by the instant disclosure may include a platform for implementing a platform, language, database, and cloud agnostic office space assigning module configured to implement an automated AI system to automate method for gaining insights and generating robust data driven decisions based on attendance data, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically generating robust data driven decisions based on attendance data by utilizing one or more processors along with allocated memory, the method comprising:

receiving, via a user interface, attendance data and population data, wherein the population data indicates which team among a plurality of teams a given employee belongs to;

implementing an Artificial Intelligence (AI) system, wherein the AI system includes an AI module and an AI planner;

establishing a communication link between the user interface and the AI system via a communication interface;

wherein the AI system is implemented by an office space assigning module (OSAM) comprising, feeding module, a receiving module, invoking module, generating module, updating module, and communication module that interoperate via a communication network and distributed server architecture;

feeding, by calling the feeding module via a first Application Programming Interface (API), the attendance data and population data into the AI system, wherein the AI system automatically calculates the plurality of teams' attendance on any given date which is present in the attendance data;

receiving input data from a user indicating whether the user wants to invoke a first process or a second process, by calling the receiving module via a second API;

invoking the AI module, by calling the invoking module via a third API, in response to receiving the input data, that automatically generates a solution according to an AI model and configurable constraints;

automatically generating, by the AI planner by calling the generating module via a fourth API, robust data driven decisions report in accordance with the solution;

receiving input data from the user indicating that the user wants to invoke the first process;

receiving target desk count data as the configurable constraints from the user for which the user wants to fit a group of employees into an office space;

invoking the AI module, by calling the invoking module via the third API, that automatically generates the solution according to the AI model and the target desk count data, wherein the attendance data further includes proximity sensor data indicative of employee presence, and wherein the AI module formulates the solution as a mixed integer linear program subject to deterministic and robust attendance shift constraints including a budget uncertainty set defining possible variations in team attendance, and wherein the solution minimizes an objective function comprising at least (i) the number of teams affected and (ii) the number of employees affected, wherein the AI module executes the mixed integer linear program using distributed parallel processing across plural computing nodes to ensure satisfaction of the robust constraints under worst-case uncertainty scenarios;

automatically generating, by the AI planner, the robust data driven decisions report that includes suggestion data comprising minimum changes to attendance patterns that allows the group of employees to fit into the office space; and interacting, by utilizing the user interface, with the AI planner, reviewing the suggestion data, and the received target desk count until a satisfiable solution has been found, wherein the updating module dynamically re-solves the mixed integer linear program in response to changes in team size, space capacity, or sensor-detected attendance fluctuations to continuously reallocate desk capacity, and wherein the OSAM is platform, language, database, and cloud agnostic and utilizes configuration files written in JSON or equivalent structured configuration languages to dynamically reconfigure the optimization engine without recompilation.

2. The method according to claim 1, wherein the attendance data for an observed period specifies employees that came in on any given day, and the method further comprising:

providing the attendance data in either a standard tabular format in a spreadsheet or directly receiving the attendance data via an integration to a central office attendance management system.

3. The method according to claim 1, further comprising: receiving the population data from an internal human resource system.

4. The method according to claim 1, wherein the first process corresponds to a process that describes how to robustly fit employees into a given office space, and whether there are any attendance shifts that can be made to make allocation of the employees feasible.

5. The method according to claim 1, wherein the second process corresponds to a process that describes, by being distributionally robust, which accounts of uncertainty in an observed attendance data for each team, how many seats a given group of employees requires to satisfy desk demand with a given reliability.

6. The method according to claim 1, further comprising:

receiving input data from the user indicating that the user wants to invoke the second process;

receiving a desired reliability data as the configurable constraints from the user for which the AI planner ensures that the desired reliability data is being accommodated in future attendance data;

invoking the AI module that automatically generates the solution according to the AI model and the desired reliability data;

interacting, by utilizing the user interface, with the AI planner reviewing the solution, to gauge whether changes to any team's attendance patterns are beneficial in a particular use case;

updating the shifts to see an impact on desks needed; and automatically generating, by the AI planner, the robust data driven decisions report that includes number of desks needed that robustly satisfy seat demand along with any updated attendance patterns shifts that have been accepted in the step of updating.

7. A system for automatically generating robust data driven decisions based on attendance data, the system comprising:

a processor; and a memory operatively connected to the processor via a communication interface, the memory storing computer readable instructions, when executed, causes the processor to:

receive, via a user interface, attendance data and population data, wherein the population data indicates which team among a plurality of teams a given employee belongs to;

implement an Artificial Intelligence (AI) system, wherein the AI system includes an AI module and an AI planner;

establish a communication link between the user interface and the AI system via a communication interface;

wherein the AI system is implemented by an office space assigning module (OSAM) comprising, feeding module, a receiving module, invoking module, generating module, updating module, and communication module that interoperate via a communication network and distributed server architecture;

feed, by calling the feeding module via a first Application Programming Interface (API), the attendance data and population data into the AI system, wherein the AI system automatically calculates the plurality of teams' attendance on any given date which is present in the attendance data;

receive input data from a user indicating whether the user wants to invoke a first process or a second process, by calling the receiving module via a second API;

invoke the AI module, by calling the invoking module via a third API, in response to receiving the input data, that automatically generates a solution according to an AI model and configurable constraints;

automatically generate, by the AI planner by calling the generating module via a fourth API, robust data driven decisions report in accordance with the solution;

receive input data from the user indicating that the user wants to invoke the first process;

receive target desk count data as the configurable constraints from the user for which the user wants to fit a group of employees into an office space;

invoke the AI module, by calling the invoking module via the third API, that automatically generates the solution according to the AI model and the target desk count data, wherein the attendance data further includes proximity sensor data indicative of employee presence, and wherein the AI module formulates the solution as a mixed integer linear program subject to deterministic and robust attendance shift constraints including a budget uncertainty set defining possible variations in team attendance, and wherein the solution minimizes an objective function comprising at least (i) the number of teams affected and (ii) the number of employees affected, wherein the AI module executes the mixed integer linear program using distributed parallel processing across plural computing nodes to ensure satisfaction of the robust constraints under worst-case uncertainty scenarios;

automatically generate, by the AI planner, the robust data driven decisions report that includes suggestion data comprising minimum changes to attendance patterns that allows the group of employees to fit into the office space; and interact, by utilizing the user interface, with the AI planner, reviewing the suggestion data, and the received target desk count until a satisfiable solution has been found, wherein the updating module dynamically re-solves the mixed integer linear program in response to changes in team size, space capacity, or sensor-detected attendance fluctuations to continuously reallocate desk capacity, and wherein the OSAM is platform, language, database, and cloud agnostic and utilizes configuration files written in JSON or equivalent structured configuration languages to dynamically reconfigure the optimization engine without recompilation.

8. The system according to claim 7, in the attendance data for an observed period specifies employees that came in on any given day, the processor is further configured to:

provide the attendance data in either a standard tabular format in a spreadsheet or directly receive the attendance data via an integration to a central office attendance management system.

9. The system according to claim 7, wherein the processor is further configured to:
receive the population data from an internal human resource system.

10. The system according to claim 7, wherein the first process corresponds to a process that describes how to robustly fit employees into a given office space, and whether there are any attendance shifts that can be made to make allocation of the employees feasible.

11. The system according to claim 7, wherein the second process corresponds to a process that describes, by being distributionally robust, which accounts of uncertainty in an observed attendance data for each team, how many seats a given group of employees requires to satisfy desk demand with a given reliability.

12. The system according to claim 7, wherein the processor is further configured to:
receive input data from the user indicating that the user wants to invoke the second process;
receive a desired reliability data as the configurable constraints from the user for which the AI planner ensures that the desired reliability data is being accommodated in future attendance data;
invoke the AI module that automatically generates the solution according to the AI model and the desired reliability data;
interact, by utilizing the user interface, with the AI planner reviewing the solution, to gauge whether changes to any team's attendance patterns are beneficial in a particular use case;
update the shifts to see an impact on desks needed; and
automatically generate, by the AI planner, the robust data driven decisions report that includes number of desks needed that robustly satisfy seat demand along with any updated attendance patterns shifts that have been accepted in the step of updating.

13. A non-transitory computer readable medium configured to store instructions for automatically generating robust data driven decisions based on attendance data, the instructions, when executed, cause a processor to perform the following:
receiving, via a user interface, attendance data and population data, wherein the population data indicates which team among a plurality of teams a given employee belongs to;
implementing an Artificial Intelligence (AI) system, wherein the AI system includes an AI module and an AI planner;
establishing a communication link between the user interface and the AI system via a communication interface;
wherein the AI system is implemented by an office space assigning module (OSAM) comprising, feeding module, a receiving module, invoking module, generating module, updating module, and communication module that interoperate via a communication network and distributed server architecture;
feeding, by calling the feeding module via a first Application Programming Interface (API), the attendance data and population data into the AI system, wherein the AI system automatically calculates the plurality of teams' attendance on any given date which is present in the attendance data;
receiving input data from a user indicating whether the user wants to invoke a first process or a second process, by calling the receiving module via a second API;
invoking the AI module, by calling the invoking module via a third API, in response to receiving the input data, that automatically generates a solution according to an AI model and configurable constraints;
automatically generating, by the AI planner by calling the generating module via a fourth API, robust data driven decisions report in accordance with the solution;
receiving input data from the user indicating that the user wants to invoke the first process;
receiving target desk count data as the configurable constraints from the user for which the user wants to fit a group of employees into an office space;
invoking the AI module, by calling the invoking module via the third API, that automatically generates the solution according to the AI model and the target desk count data, wherein the attendance data further includes proximity sensor data indicative of employee presence, and wherein the AI module formulates the solution as a mixed integer linear program subject to deterministic and robust attendance shift constraints including a budget uncertainty set defining possible variations in team attendance, and wherein the solution minimizes an objective function comprising at least (i) the number of teams affected and (ii) the number of employees affected, wherein the AI module executes the mixed integer linear program using distributed parallel processing across plural computing nodes to ensure satisfaction of the robust constraints under worst-case uncertainty scenarios;
automatically generating, by the AI planner, the robust data driven decisions report that includes suggestion data comprising minimum changes to attendance patterns that allows the group of employees to fit into the office space; and
interacting, by utilizing the user interface, with the AI planner, reviewing the suggestion data, and the received target desk count until a satisfiable solution has been found,
wherein the updating module dynamically re-solves the mixed integer linear program in response to changes in team size, space capacity, or sensor-detected attendance fluctuations to continuously reallocate desk capacity, and
wherein the OSAM is platform, language, database, and cloud agnostic and utilizes configuration files written in JSON or equivalent structured configuration languages to dynamically reconfigure the optimization engine without recompilation.

14. The non-transitory computer readable medium configured according to claim 13, in the attendance data for an observed period specifies employees that came in on any given day, the instructions, when executed, cause the processor to further perform the following:
providing the attendance data in either a standard tabular format in a spreadsheet or directly receiving the attendance data via an integration to a central office attendance management system.

15. The non-transitory computer readable medium configured according to claim 13, wherein the instructions, when executed, cause the processor to further perform the following:
receiving the population data from an internal human resource system.

16. The non-transitory computer readable medium configured according to claim 13, wherein the first process corresponds to a process that describes how to robustly fit employees into a given office space, and whether there are any attendance shifts that can be made to make allocation of the employees feasible.

17. The non-transitory computer readable medium configured according to claim 13, wherein the instructions, when executed, cause the processor to further perform the following:

receiving input data from the user indicating that the user wants to invoke the second process;

receiving a desired reliability data as the configurable constraints from the user for which the AI planner ensures that the desired reliability data is being accommodated in future attendance data;

invoking the AI module that automatically generates the solution according to the AI model and the desired reliability data;

interacting, by utilizing the user interface, with the AI planner reviewing the solution, to gauge whether changes to any team's attendance patterns are beneficial in a particular use case;

updating the shifts to see an impact on desks needed; and automatically generating, by the AI planner, the robust data driven decisions report that includes number of desks needed that robustly satisfy seat demand along with any updated attendance patterns shifts that have been accepted in the step of updating.

* * * * *